April 9, 1968      N. H. NYE      3,377,025
WATER AERATION APPARATUS

Filed May 31, 1966      3 Sheets-Sheet 1

INVENTOR.
NORMAN H. NYE
BY Oldham & Oldham
ATTYS.

April 9, 1968  N. H. NYE  3,377,025
WATER AERATION APPARATUS
Filed May 31, 1966  3 Sheets-Sheet 2
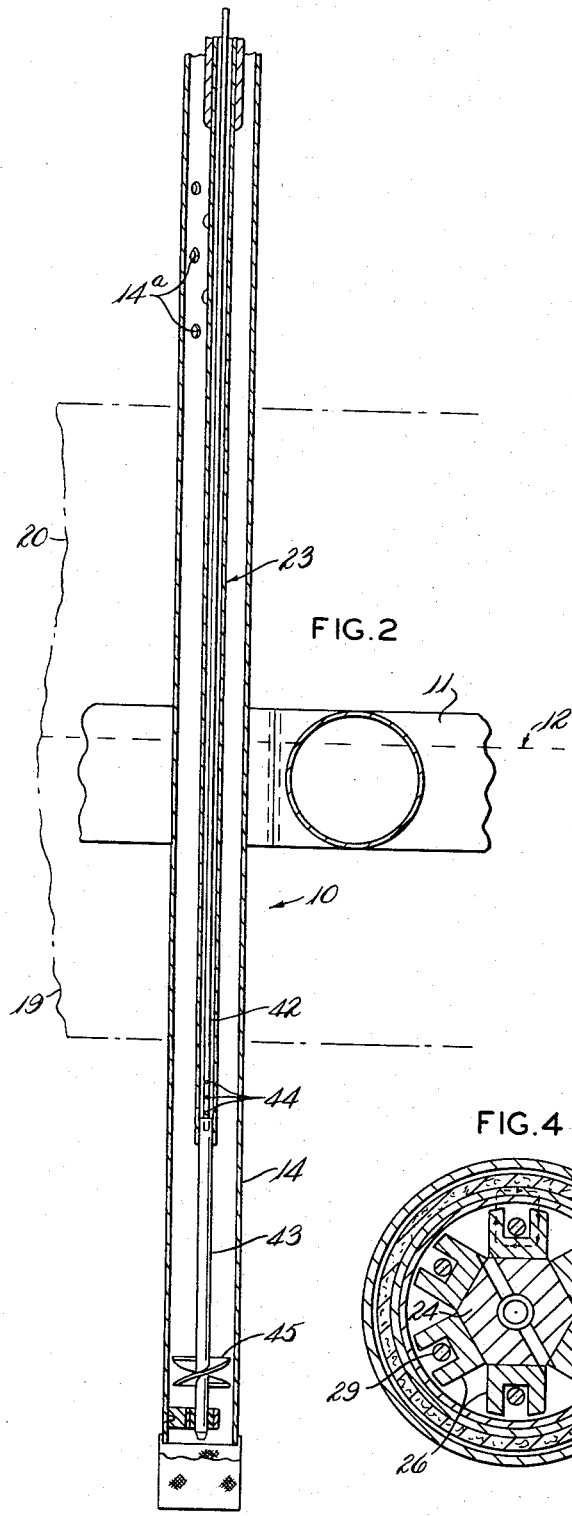
FIG. 2
FIG. 4
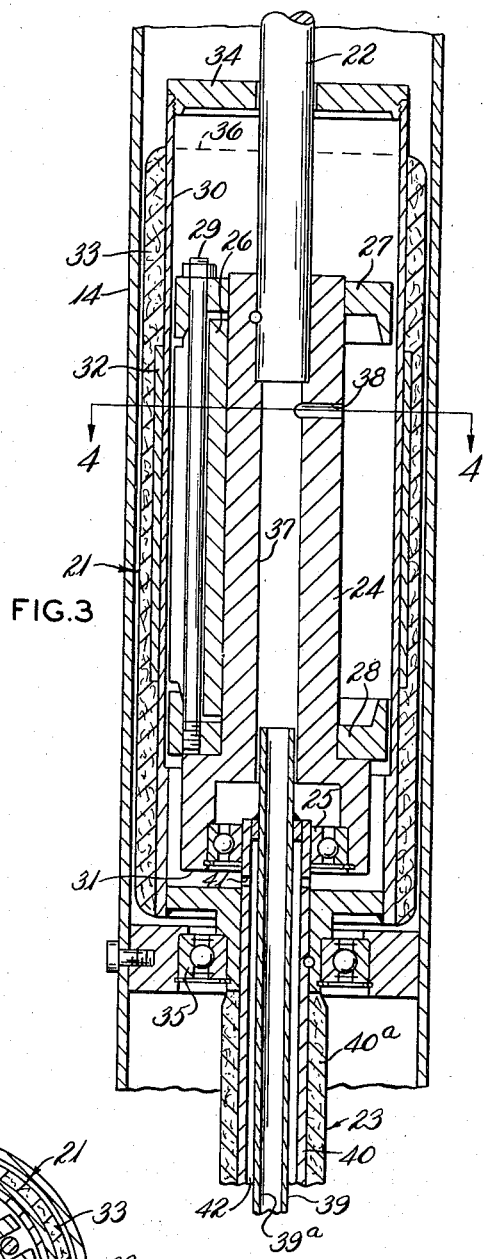
FIG. 3
INVENTOR.
NORMAN H. NYE
BY Oldham & Oldham
ATTYS.

April 9, 1968

N. H. NYE 3,377,025

WATER AERATION APPARATUS

Filed May 31, 1966

INVENTOR.
NORMAN H. NYE
BY Oldham & Oldham
ATTYS.

United States Patent Office 3,377,025
Patented Apr. 9, 1968

3,377,025
WATER AERATION APPARATUS
Norman H. Nye, 1348 Highbridge Road,
Cuyahoga Falls, Ohio 44223
Filed May 31, 1966, Ser. No. 553,931
10 Claims. (Cl. 239—16)

The present invention relates to novel and improved apparatus for aeration of water, and particularly to a wind driven apparatus for causing turbulence in bodies of water for aeration thereof, particularly to provide oxygen in the water for maintenance of aquatic life in the body of water.

Heretofore there have been various types of aeration apparatus provided and in one instance, at least, apparatus has been proposed in U.S. Patent No. 2,116,023 wherein a windmill is provided for driving a pump means for forcing compressed air down to the lower portion of the apparatus for exhaust into liquid water adjacent the bottom of the body of water to be aerated. Other efforts have been made to oxygenate shallow ponds. However, insofar as I am aware, none of the apparatus proposed heretofore has been completely satisfactory, and such apparatus usually does not provide means for melting water that has frozen in association with the apparatus.

The general object of the present invention is to provide novel and improved apparatus for the aeration of water, and particularly apparatus which is adapted to thaw water that has frozen in contact with the apparatus and to provide aeration circulation of a body of water with which the apparatus is associated.

Another object of the invention is to provide automatic apparatus for aerating water wherein the apparatus is sturdy and is adapted to be driven by wind forces and where the apparatus is designed to generate heat in portions of the apparatus associated with the frozen surface area of the water for melting some of such frozen water and providing aeration circulation in the body of water.

Another object of the invention is to provide a low cost, usually wind driven water aeration apparatus wherein special drive means are provided for the aeration portion of the apparatus and coupling means are provided between the wind driven portion of the apparatus and the water aeration portion thereof whereby heat can be generated in such coupling means should the water with which the apparatus is associated become frozen during any period of inactivity of the apparatus of the invention.

The foregoing and other objects and advantages of the invention will be made more apparent as the specification proceeds.

Attention now is particularly directed to the accompanying drawings, wherein:

FIG. 2 is a fragmentary vertical section through a portion of the apparatus of FIG. 1;

FIG. 3 is an enlarged fragmentary vertical section of the coupling means present in the upright tube or column of the apparatus shown in FIGS. 1 and 2;

FIG. 4 is a horizontal cross section taken on line 4—4 of FIG. 3 and showing the magnetic means used in the power coupling or clutch means of the invention;

When referring to corresponding members shown in the drawings and referred to in the specification, corresponding numerals are used to facilitate comparison therebetween.

Figure 1:
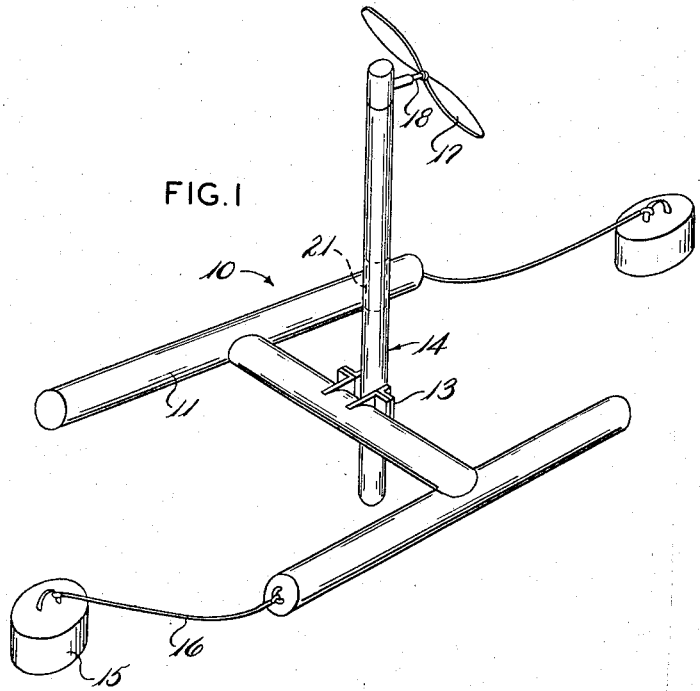
FIG. 1 is a perspective view, to a reduced scale, of the water aeration apparatus embodying the principles of the invention.

Generally speaking, this invention relates to a water aeration apparatus for positioning in a body of water to extend upwardly and downwardly of the surface of the water, which apparatus includes an enclosure member extending substantially the height of the apparatus, a drive shaft received in the upper portion of the enclosure member and terminating at a point above the water surface, means engaging the drive shaft to drive it, a lower shaft operatively positioned in the lower portion of the enclosure member, which lowershaft is hollow and has radially spaced inner and outer walls forming a chamber in the portion of such shaft to be positioned at, immediately above, and immediately below the surface of the body of water in which the apparatus is to be positioned, pump means operatively engaging the lower shaft and communicating operatively with the body of water in which the apparatus is positioned and with the interior of the enclosure member to force water upwardly thereof when the pump means is driven, the enclosure member being apertured above the surface of the body of water for discharge of water therethrough, and clutch means operatively coupling the drive shaft to the lower shaft for drive thereof, the clutch means being immersed in a liquid which is not freezable under ambient atmospheric temperatures and which liquid is also received in the chamber in flow connection to the liquid surrounding the clutch means whereby if said lower shaft is embedded in ice the liquid will be heated and caused to flow in the chamber to melt such ice and free the lower shaft for rotation.

Reference now is particularly directed to the accompanying drawings, and a water aeration apparatus of the invention is indicated as a whole by the numeral 10. This apparatus 10 includes a suitable frame means such as a pontoon 11 formed from suitable members secured together in any conventional manner to provide a float or other means that will normally be buoyantly supported upon the surface of a body of water indicated by the numeral 12. This pontoon or float 11 may have suitable means, such as brackets 13, associated therewith and in all events the pontoon 11 is adapted to have a vertically extending pipe or enclosure member 14 secured thereto by such means. This pipe or enclosure member 14 is of any desired height and normally will extend 10 or more feet above the surface of the lake 12 and it will also extend downwardly of the surface of the lake an appreciable distance such as 2 to 6 or 8 ft. depending upon the depth of the lake 12 so that the enclosure member or pipe 14 will, in all instances, be positioned appreciably spaced from the bottom of the lake to avoid being clogged or contaminated with sediment from the lake. The pontoon 11 normally will have conventional anchor means 15 flexibly secured thereto by cables 16.

FIG. 1 of the drawings best shows that the pipe 14 has a suitable drive member, such as a propeller 17 carried by a shaft 18 that is journalled on the pipe 14 and connects to driven members therein, as hereinafter explained. The propeller 17 is of conventional design and normally is driven in one predetermined direction, but is reversible, by wind blowing on the apparatus 10. Usually the apparatus is used in a location where the prevailing winds are from a known direction and the apparatus is so positioned that normally the propeller 17 faces the prevailing winds to be driven thereby whenever sufficient wind forces exist.

FIG. 2 of the drawings best shows how the pipe 14 extends through the surface of the lake 12 and extends an appreciable distance above and below any ice 19 or snow 20 that may be present on the lake or be associated with the apparatus 10.

FIGS. 3 and 4 show details of a magnetic clutch or coupling means 21 that is provided in the pipe 14 and as indicated in FIG. 1. Such magnetic clutch is positioned appreciably above the surface of the lake 12 to transmit power between a drive shaft 22 received in an upper end of the pipe 14 and a lower shaft, or driven shaft means 23, provided in and extending axially of the pipe 14 for the portion thereof associated with the surface of the lake 12 and extending down to the lower end of the pipe 14. The drive shaft 22 extends to the upper end of the pipe 14 and is coupled to the propeller shaft 18 by any conventional means whereby power is transmitted to the drive shaft 22 whenever the propeller 17 is driven by the prevailing winds exerted on the apparatus 10. The drive shaft 22 has its lower end suitably secured to a hub 24 provided in the magnetic clutch 21. The lower end of the hub 24 preferably is supported on and journalled on the upper end of the lower shaft 23 as by means of a thrust bearing 25 positioned therebetween. The hub 24 preferably has a plurality of elongate permanent magnets 26, of substantially U-shape in horizontal section, secured to axially extending portions of the hub in equally spaced circumferential relationship. The permanent magnets 26 can be secured to the hub in any desired manner, but they can be conveniently secured to the hub, as by non-magnetic end caps 27 and 28 that are carried by the hub 24 and have non-magnetic bolts 29 connecting to and extending between the end caps and compressively engaging the permanent magnets to press them securely to the hub. The permanent magnets 26 have a sleeve 30 positioned in closely encompassing relationship thereto and such sleeve 30 is secured at its lower end to an end plate or disc 31 which in turn is secured to the upper end portion of the lower shaft 23. Such sleeve 30 is made from any known non-magnetic material, usually aluminum, and it has a magnetic sleeve 32 suitably secured thereto on the outer surface thereof in the vertical portion of the sleeve 30 associated with the operative lengths of the permanent magnets 26. This sleeve 32 may, for instance, be made from soft steel and it may have a heat insulating jacket or sleeve 33 secured thereover and suitably affixed to the exposed end portions of the longer sleeve 30 by which the sleeve 32 is positioned. An upper end cap or plate 34 is secured to the upper end of the sleeve 30 to form a chamber therewith and normally the drive shaft 22 extends through such upper end cap into the magnetic clutch for connection thereto. Hence, under normal operating conditions wheer the lower shaft 23 is free to turn, drive forces are transmitted from the drive shaft 22 through the permanent magnets 26 and the flux paths created thereby which cause flux to flow out to and through the magnetic sleeve 32 whereby such sleeve will tend to rotate with the drive shaft 22 and transmit torque to the lower shaft 23.

The upper end of the lower shaft 23 is suitably journalled in and supported by conventional means, such as a ring bearing 35, that is secured within the pipe 14 and aids in positioning the lower shaft 23 for drive action in the pipe 14.

It should be noted that the magnetic clutch 21 of the invention has a further novel means therein, and this comprises embedding the component parts of the magnetic clutch in some suitable liquid, such as oil, which will not freeze nor become quite viscous under normal ambient operating temperatures to which the apparatus 10 is subjected. This oil is received in the magnetic clutch and normally has an upper level as indicated by the line 36 on the drawings. It will be noted that the hub 24 has a bore 37 provided therein and a radially extending bore 38 extends through the hub adjacent its upper end to connect the bore 37 to the portion of the magnetic clutch around the periphery of the hub 24. This oil is free to circulate in the magnetic clutch and can flow down through the clutch between the inner periphery of the sleeve 30 and the outer periphery of the lower end portion of the hub 24. The lower shaft 23, as a further feature of the invention, includes an inner tube 39 and an outer tube 40 which are positioned in radially spaced relationship to form a chamber 42 therebetween. The interior bore of the inner tube 39 connects to the bore 37 in the hub, while the lower portion of the magnetic clutch connects through bores 41 formed in the outer tube 40 so that such oil or other liquid can flow down through the chamber 42 provided between the tubes 39 and 40. Such chamber 42 extends to the lower end portion of the lower shaft 23, FIG. 2, wherein such shaft is shown with a shaft extension 43 secured thereto and extending downwardly therefrom and the chamber 42 terminates. At this portion of the lower shaft 23, a plurality of bores or apertures 44 are provided in the inner tube 39 whereby a flow connection is provided between the chamber 42 and the bore 39a of such inner tube so that oil flowing down in the chamber 42 can exhaust therefrom and flow upwardly of the bore 39a into the structure shown in FIG. 3. Hence, if water which will be setting in the pipe 14 and encompassing the lower shaft 23 up to the level of the surface of the lake 12 freezes, such lower shaft 23 will be immobilized and the lower shaft will not turn with the drive shaft 22 at such time. Thus, under these freezing conditions, the oil positioned in the magnetic clutch will be agitated by the rotation of the drive shaft 22 and the associated permanent magnets 26 carried by the hub 24 whereby such oil will be forced to flow down around the periphery of the magnetic clutch and down through the bores 41 into the chamber 42 and will tend to melt or transfer heat to the ice surrounding such outer tube 40 to cause it to melt and thus ultimately to free the lower shaft 23 for rotation. The oil surrounding the magnetic clutch will be heated by eddy currents generated in the sleeve 30 by rotation of the permanent magnets and such heating of the oil and the ensuing circulation thereof will provide a rapid and effective means for freeing the lower shaft 23 from any ice in which it is embedded. An insulating sleeve 40a may be secured to the outer tube 40 at the magnetic clutch and extend to a point slightly above the level of the lake 12.

FIG. 2 of the drawings shows how the shaft extension 43 may have any suitable pump means, such as an impeller blade or blades 45, secured to the lower end thereof and adapted to lift water from the lake 12 vertically upwardly of the pipe 14 when it is driven. This impeller 45 hence causes vertical upward flow of water in the pipe 14 and such water then may exhaust therefrom through suitable apertures or bores 14a provided in the pipe 14 above the surface of the lake and normally above any accumulation of snow on the ice 19 on the lake whereby a flow of water in the lake will be started, and the warmer water being pumped upwardly in the pipe 14 will aid in melting any ice formed therein and the discharge of such water adjacent the pipe 14 will in turn likewise provide a melting action for the ice and snow surrounding the pipe 14. Hence, by continued operation of the apparatus 10 for any extended length of time, an appreciable flow of water in the lake 12 can be provided and the water discharged by the apparatus will be aerated and tend to cause circulation in the lake to further aid in the desired oxygenation of the water of the lake to permit it to maintain plant and animal life, including fish. By providing a plurality of the apparatus 10 at different locations of a lake, even a sizable body of water can be sufficiently oxygenated as to maintain fish and other life in the lake even under severe freezing conditions. It will be realized that usually sufficient wind forces exist in most areas of the country that the apparatus 10 will be driven for appreciable periods of time nearly every day and with the apparatus as shown and described, any frozen water associated with the apparatus will be thawed relatively rapidly whereby the apparatus will function efficiently and at low cost with a minimum of maintenance.

Figure 5:
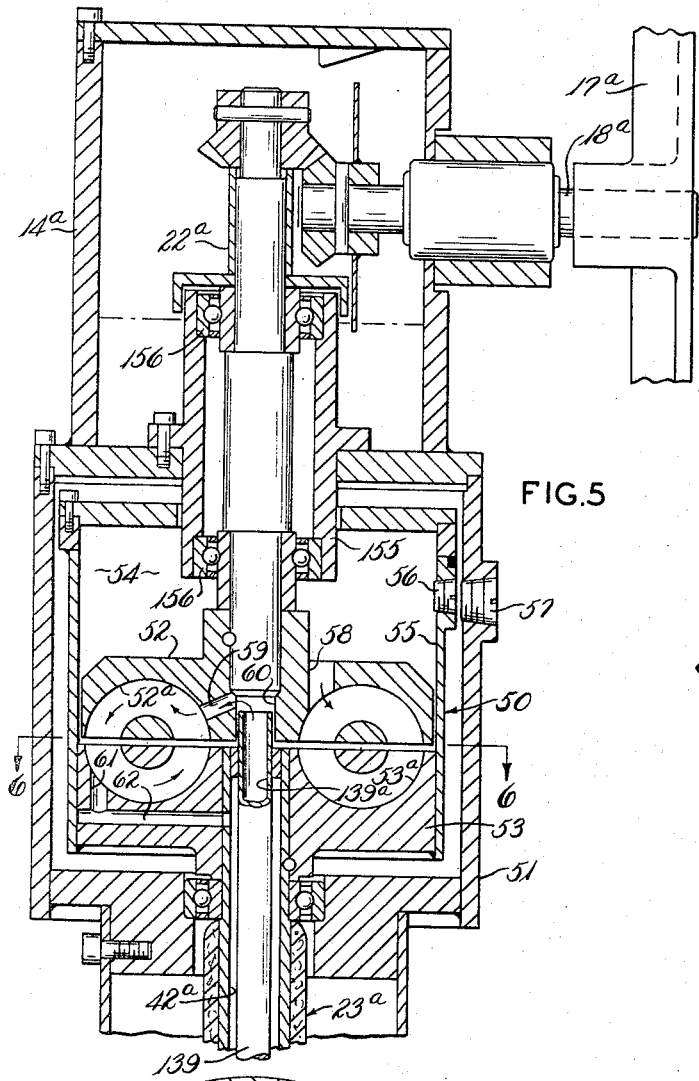
FIG. 5 is a fragmentary vertical section, like FIG. 3, of a modification of the invention.
Figure 6:
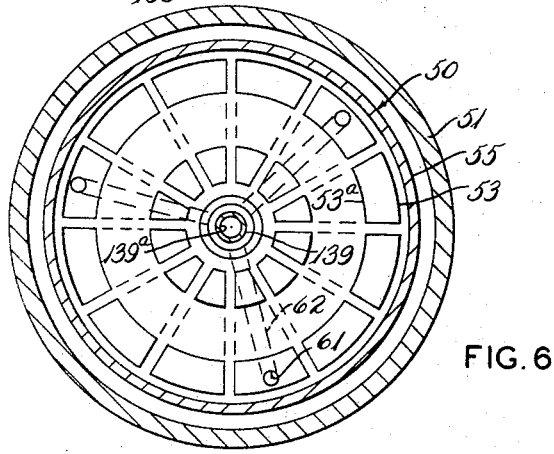
FIG. 6 is a horizontal section taken on line 6—6 of FIG. 5.

In the modification of the magnetic clutch means and other apparatus of the invention as shown in FIGS. 5 and 6, a fluid clutch 50 is substituted for the magnetic clutch 21. These figures of the drawings show part of a propeller 17a that is carried by a shaft 18a journalled in any desired manner at the upper end of an enclosure or pipe 14a. An upper or drive shaft 22a is positioned in the pipe 14a and suitably journalled therein whereby drive forces can be transmitted to this shaft when the propeller 17a is driven by prevailing winds.

In this instance, the pipe 14a may have a suitable enlarged section, or chamber 51 suitably secured thereto and forming a length thereof and this chamber 51 is provided for enclosing the components of the fluid clutch 50. The lower end of the drive shaft 22a has a suitable drive impeller or plate 52 secured thereto and facing downwardly therefrom while a driven impeller 53 is in turn suitably secured to the upper end of a lower shaft 23a and faces upwardly, being positioned in operative and adjacent relationship to the downwardly facing drive impeller 52. These impellers 52 and 53 preferably are received within an inner chamber 54 provided by an enclosure 55 which enclosure 55 preferably is formed as a continuation of and an operative part of the driven impeller 53 and extends up around and encompasses the drive impeller 52. The enclosure 55 is in substantially sealed relationship with any suitable connecting or positioning sleeve or means 155 associated with and/or carried by an upper or drive shaft 22a. The positioning sleeve 155 is secured to the section 51 of the pipe and it journals the shaft 22a therein by bearings 156. Suitable access openings are provided in the enclosure 55 and chamber 51 and they may comprise openings shown in FIG. 5 and closed by closure plugs 56 and 57, respectively, as shown.

As in the other embodiment of the invention, a suitable liquid is provided in the fluid clutch 50 and this liquid will not freeze under normal temperature conditions. The impellers 52 and 53 may have any suitably shaped blades 52a and 53a provided thereon to transmit torque forces thereby by the surrounding liquid and fluid will flow into the base portion of the impeller 52 through one or more bores 58 formed through the back portion thereof and/or through bores 59 connecting to a center bore 60 of the drive impeller 52. Fluid can also flow up from a bore 139a of the inner sleeve 139 provided in the lower shaft out to the driven impeller 52, and fluid will exhaust from the driven impeller 53 through suitable bores and/or holes 61, 62 formed therein and connecting to a chamber 42a formed between the two sleeve portions or tubes of the lower shaft 23a provided in this embodiment of the invention. Hence, again, the fluid received in the clutch means used in the invention will be agitated by the drive of the drive shaft 22a and, if the driven impeller 52 is locked in a given position by ice surrounding the lower shaft 23a, then the fluid will be heated by agitation in the fluid clutch and will circulate down to the portion of the lower shaft that is frozen and such shaft can be released by thawing the ice thereadjacent whereby flow of water up through the apparatus of the invention will be started and any remaining ice in the system will be gradually thawed and flow therefrom.

Figure 7:
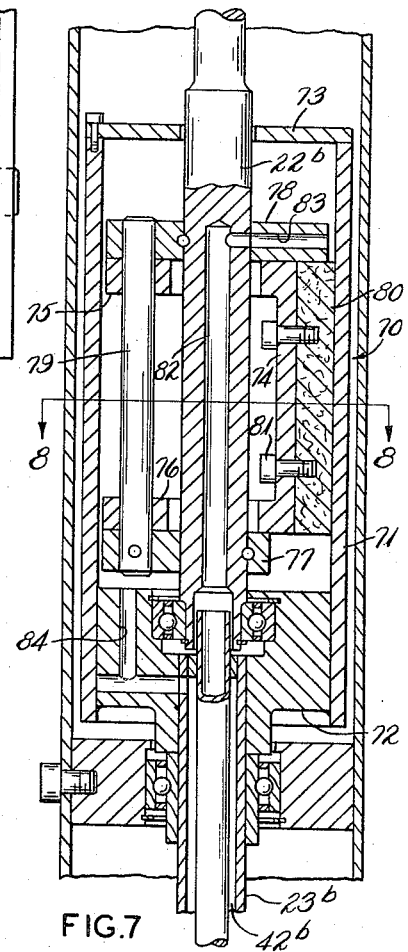
FIG. 7 is a fragmentary enlarged vertical section of a further modification of the clutch means used in the apparatus of the invention.
Figure 8:
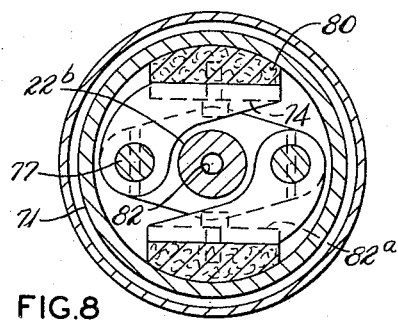
FIG. 8 is a horizontal section taken on line 8—8 of FIG. 7.

A friction type of a clutch or coupling means of the invention is indicated by the numeral 70 and is shown in FIGS. 7 and 8 to replace the clutch means shown in the other embodiments of the invention. In this instance, the friction clutch 70 is received within an enclosure primarily formed by a vertically extending sleeve 71 having a lower end cap or plate 72 secured thereto and suitably secured to the upper end of a lower shaft 23b present in this embodiment of the invention. An upper end cap 73 completes the enclosure. The lower end of a drive shaft 22b, as shown in FIG. 7, preferably has a vertically extending clutch plate 74 pivotally secured thereto by a pair of upper and lower positioning arms 75 and 76 that engage the clutch plate 74, and in turn are secured to positioning arms 77 and 78 that are secured to and extend from axially spaced portions of the drive shaft 22b. Any suitable means, such as a bolt 79, extends between arms or discs 77 and 78 to pivotally secure the clutch plate 74 and associated positioning arms to the arms 77 and 78 for pivotal movement with relation thereto. A suitable frictional type brake block or brake lining member 80 is adjustably secured to the clutch plate 74 by cap screws 81. The brake block 80 has an arcuate peripheral surface contoured complementary to the inner bore of the sleeve 71 for frictional engagement therewith. Thus, centrifugal forces created by rapid rotation of the drive shaft 22b will cause the clutch plate 74 and a similar clutch plate 82a that is positioned in diametrically opposed relationship thereto by members equivalent to that described in association with the clutch plate 74 and the two friction block means or brake linings in the friction clutch assembly to be forced out and engage the sleeve 71 to cause the lower shaft 23b to rotate with the drive of the driven shaft 22b.

Again, it is a feature of the invention that a fluid will be provided within the enclosure formed by the sleeve 71 to provide for circulation and heating of the fluid should the lower shaft 23b be frozen in the body of water in which the apparatus is immersed. In this instance, the upper end of the inner tube in the lower shaft 23b communicates with a bore 82 provided in the lower end of the drive shaft 22b and such bore 82 usually connects through an exhaust bore or port 83 formed in the arm 78 adjacent the upper end of the enclosure provided by the sleeve 71. Hence fluid will be discharged from the bore 82 through such bore 83 and then the fluid will flow down around the friction brake block means in the clutch and it will flow down through a bore or bores 84 provided in the lower end cap 72. The bore or bores 84 connect to a chamber 42b provided between the inner and outer tubes in the lower shaft 22b to circulate down through any frozen portion of the water with which the apparatus is associated for return upward flow through the bore of the inner tube in the lower shaft, all as previously described. Such fluid (liquid) is heated by the friction in the clutch 70.

Figure 9:
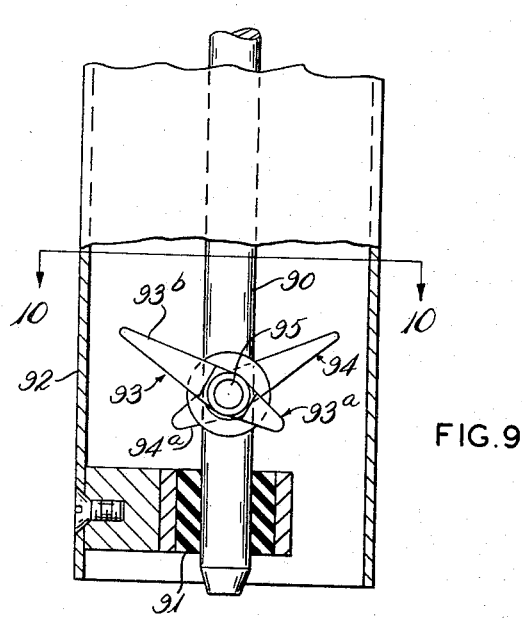
FIG. 9 is a fragmentary enlarged vertical section of a portion of the lower end of one of the columns and pump means that may be used in the apparatus of the invention.
Figure 10:
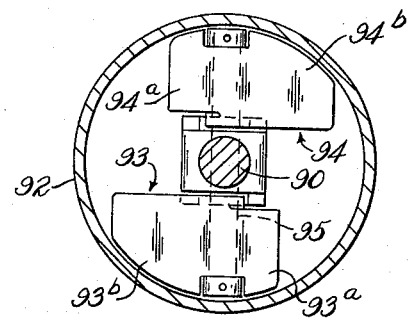
FIG. 10 is a plan view of the apparatus of FIG. 9 taken on line 10—10 thereof.

FIGS. 9 and 10 show a modified type of pump means such as can be used with the apparatus of the invention in lieu of that shown in FIG. 2 of the drawings. Thus, in this instance, a lower shaft or lower shaft extension 90 is shown journalled in a suitable bearing 91 affixed to the lower open end of an enclosure or pipe 92. The shaft 90 pivotally carries, usually, a pair of impellers or blades 93, 94 wherein each of these blades 93, 94 is positioned at an upwardly extending angle in relation to the horizontal, and the blades are divided into short blade sections 93a, 94a and relatively long blade sections 93b and 94b, as shown by a support shaft 95. Thus, in all instances, regardless of the direction of rotation of the lower shaft 90, the blades will take such a position so as to lift water vertically upwardly in the tube 92 and cause vertical upward flow of the water in the apparatus for the aeration action as referred to hereinbefore. The support shaft 95 engages and rotates with the lower shaft 90 to pump water for either direction of rotation.

In some instances, it may be suitable to connect other drive means, such as an electric motor to the drive shaft 22 for supply of power thereto rather than the wind driven propeller.

It will be realized that the enclosures or pipes 14 and equivalents used in practice of the invention can be of any suitable length and they will extend down in the body of water a sufficient distance as to reach water which is at a higher temperature than the ice formed on the surface of the lake. It will be seen that circulation of such above freezing temperature water in the apparatus will aid in the thawing action of any ice or snow with which the apparatus 10 is associated, and flow of such water or discharge of the water from the apparatus will produce thawing of the snow and ice surrounding the apparatus. Hence, additional water can be exposed for natural aeration action and the objects of the invention will be achieved.

I claim:

1. A water aeration apparatus for positioning in a body of water to extend upwardly and downwardly of the surface of the water which apparatus includes
   a hollow enclosure member extending substantially the height of the apparatus,
   a drive shaft operatively received in the upper portion of said enclosure member and extending axially thereof to a point above said water surface,
   means engaging said drive shaft to drive it,
   a lower shaft operatively positioned in the lower portion of said enclosure member, which lower shaft is hollow and has radially spaced inner and outer walls with closed ends to form a chamber therebetween in the portion of such shaft to be positioned at, immediately above, and immediately below the surface of the body of water in which the apparatus is to be positioned,
   pump means operatively engaging the lower end of said lower shaft and communicating operatively with the body of water in which the apparatus is positioned and with the interior of said enclosure member to force water upwardly thereof when said pump means is driven, said enclosure member being apertured above the surface of the body of water for discharge of water therethrough, and
   clutch means operatively coupling said drive shaft to said lower shaft for drive thereof, said clutch means being immersed in a liquid which is not freezable under ambient atmospheric temperatures and which liquid is also received in said chamber in flow connection to the liquid surrounding said clutch means whereby if said lower shaft is embedded in ice said liquid will be heated and caused to flow along said chamber to melt such ice and free said lower shaft for rotation.

2. Apparatus as in claim 1 where said lower shaft is hollow and its bore operatively connects to said clutch means at one portion thereof, said chamber operatively connects to said clutch means at a portion vertically spaced from said one portion thereof, and said chamber is operatively connected adjacent its lower end to said bore of said lower shaft to form a path for flow of said liquid therethrough when said driven shaft rotates.

3. Apparatus as in claim 1 where said clutch means include
   a plurality of elongate vertically positioned permanent magnets positioned in circumferentially spaced relation and carried by said driven shaft, at least one pole of each said magnet being at the radially outer end thereof, and
   a magnetic sleeve encompassing said magnets and operatively engaging said lower shaft to transmit driving torque thereto.

4. Apparatus as in claim 3 where said magnetic sleeve is carried by a non-magnetic sleeve, on the outer surface thereof, which axially overlaps the lower end of said driven shaft and the upper end of said lower shaft, and enclosure means are secured to said non-magnetic sleeve at the ends thereof to form an enclosure around said clutch means for retaining said liquid in association with said clutch means.

5. Apparatus as in claim 1 where said clutch means include
   a plurality of elongate vertically positioned clutch members pivotally carried by said driven shaft and adapted to be the thrown outwardly by centrifugal force, and
   a sleeve encompassing said clutch members and operatively engaging said lower shaft to transmit driving torque thereto.

6. Apparatus as in claim 1 where said clutch means include
   a fluid clutch including an impeller carried by said driven shaft and an impeller carried by said lower shaft, and
   enclosure means for said impeller operatively engaging said lower shaft and the impeller thereon to transmit driving torque thereto.

7. A water aeration apparatus for positioning in a body of water to extend upwardly and downwardly of the surface of the water which apparatus includes
   an enclosure member extending substantially the height of the apparatus,
   a drive shaft journalled in the upper portion of said enclosure member and terminating above said water surface,
   means engaging said drive shaft to drive it,
   a lower shaft operatively journalled in the lower portion of said enclosure member but extending up to a point adjacent said drive shaft end,
   pump means operatively secured to said lower shaft and communicating operatively with a lower portion of the body of water in which the apparatus is positioned and with the interior of said enclosure member to force water upwardly thereof when said pump means is driven, said enclosure member being open above the surface of the body of water for discharge of water therethrough,
   clutch means operatively coupling said drive shaft to said lower shaft for drive thereof, said clutch means being operable to generate heat therein if drive is not being transmitted to said lower shaft, and
   means for transmitting heat from said clutch means to the upper portion of said lower shaft whereby if said lower shaft is embedded in ice, heat can be transmitted thereto to melt such ice and free such lower shaft for rotation.

8. Apparatus as in claim 7 where
   a floatation means is provided,
   said enclosure member is secured to said floatation means to extend vertically upwardly and downwardly therefrom, and
   said drive shaft is coupled to a wind driven propeller for rotation of such drive shaft.

9. Apparatus as in claim 7 where said clutch means is immersed in an anti-freeze type of a liquid, and
   said last-named means comprise a fluid flow circuit to transmit heat from said clutch means to the portion of said lower shaft extending through the surface of a body of water with which the apparatus is used.

10. Apparatus as in claim 7 where said pump means includes a pair of pivotally positioned members carried by said lower shaft and adapted to move water vertically upwardly of said enclosure member regardless of the direction of rotation of said lower shaft.

References Cited

UNITED STATES PATENTS 2,116,023   5/1938   Gwidt _____ 261—87

EVERETT W. KIRBY, *Primary Examiner.*